United States Patent [19]

Nicolaisen

[11] 4,161,170
[45] Jul. 17, 1979

[54] SOLAR ENERGY COLLECTION SYSTEM

[75] Inventor: Bernard H. Nicolaisen, Houston, Tex.

[73] Assignee: Olin Corporation, New Haven, Conn.

[21] Appl. No.: 852,255

[22] Filed: Nov. 17, 1977

[51] Int. Cl.$^2$ .............................................. F24J 3/02
[52] U.S. Cl. ................................................ 126/271
[58] Field of Search ................................ 126/271, 272

[56] References Cited

U.S. PATENT DOCUMENTS

| 1,101,001 | 6/1914 | willsie | 126/271 |
| 3,957,029 | 5/1976 | Nozik | 126/270 |
| 4,015,582 | 4/1977 | Liu et al. | 126/270 |
| 4,055,163 | 10/1977 | Costello et al. | 126/271 |
| 4,084,580 | 4/1978 | Roark | 126/270 |

FOREIGN PATENT DOCUMENTS

| 2643431 | 4/1977 | Fed. Rep. of Germany | 126/271 |
| 2551987 | 5/1977 | Fed. Rep. of Germany | 126/271 |
| 2343208 | 9/1977 | France | 126/271 |

OTHER PUBLICATIONS

*Solar Heating No Pie in Sky for Specialties*, In Chemical Week, Sep. 21, 1977.

*Primary Examiner*—Dave W. Arola
*Attorney, Agent, or Firm*—William A. Simons; Thomas P. O'Day

[57] ABSTRACT

A solar energy collection system which employs an asymmetric gas such as ammonia in an enclosed gas space between a black-coated solar energy absorber plate and the ambient atmosphere is described. The asymmetric gas allows solar radiation to be transmitted to the absorber plate where the radiation is converted into thermal energy. However, the asymmetric gas prevents re-radiation of infrared thermal radiation into the ambient atmosphere.

15 Claims, 4 Drawing Figures

SOLAR ENERGY COLLECTION SYSTEM

BACKGROUND OF THE INVENTION

1. Field of the Invention

The present invention relates to an improved solar energy collection system.

2. Description of the Prior Art

The number of solar energy collection systems in the marketplace has increased rapidly in the last few years. This increased has been due principally to two major reasons. One is that the underlying technical knowledge of solar energy collection has increased. Further, the rising costs of fossil fuels such as oil and natural gas has generated a need for alternative energy sources.

One of the standard solar energy collection systems on the market today is the flat-plate collector. Conventional flat-plate collectors are generally comprised of a black-coated solar energy absorber plate which is backed by a heat insulative base and protected from the ambient atmosphere by one or more layers of transparent covers. In operation, solar radiation is transmitted through the transparent covers and absorbed by the black surface into the absorber plate. The absorbed solar radiation is thereby converted into thermal energy, which is removed from the resulting heated absorber plate by air, water or other suitable heat transfer fluids which function in a heat exchanging relationship with the heated plate. The resulting heated transfer fluid can be then used for such beneficial purposes such as heating, refrigeration or electric-power generation.

Unfortunately, the flat-plate solar energy collection systems as presently known generally do not provide highly efficient energy collection. When solar radiation is converted to thermal energy on the absorber plate, not all of the resulting thermal energy can be removed by the heat transfer fluid and then be utilized in some useful form. Instead, a large amount of the thermal energy is re-radiated and lost into the ambient atmosphere through the air space between the transparent cover or covers and the absorber plate. Furthermore, large amounts of thermal energy will also leave the absorber plate and be lost by means of conduction and convection.

In the past, many attemps have been made to reudce such heat losses. For example, it has been urged that heat losses by conduction and convection may be minimized by employing multi-transparent covers and/or a vacuum in the overlying space. Further, it has been suggested that re-radiation of the thermal energy can be reduced by coating the transparent covers with special paints or films which allow a high transmittance of solar radiation to the absorber but prevent the thermal radiation of the absorber plate from being re-radiated through the transparent cover. See U.S. Pat. No. 3,957,029, issued to Nozik et. al. on May 18, 1976. It has been suggested that the re-radiation can also be reduced by filling the space with glass fibers. See U.S. Pat. No. 4,015,582, issued to Liu et. al. on Apr. 5, 1977. Still further, it has been suggested that special black paints or plating be used to coat the absorber plate in order to increase its absorbability and lower its reflectivity. See *Chemical Week*, Sept. 2, 1977, pp. 54, 56, and 58. However, these approaches do not appear to be totally satisfactory because of the efficiency of the presently known solar energy collection systems have not been raised sufficiently to justify the added costs of such improvements and/or to make such system useful for a wide degree of applications. Thus, there is still a need in the art for a simple solution to improve the relatively low efficiency of solar collectors. The present invention presents such a solution.

BRIEF SUMMARY OF THE INVENTION

The present invention is directed to an improved solar energy collection system which employs an asymmetric gas such as ammonia in an enclosed gas space which is positioned in conjunction with an absorber plate so that solar radiation may pass through the enclosed gas space to the absorber plate which will convert the solar radiation into thermal energy. Furthermore, a large portion or substantially all of the thermal re-radiation from the absorber plate will be absorbed by the asymmetric gas.

While the present invention is particularly suitable for flat-plate solar collections, it may be used with other types of solar energy collectors where solar radiation is absorbed and converted into thermal energy.

BRIEF DESCRIPTION OF THE DRAWINGS

The present invention is illustrated in the accompanying drawings which show preferred embodiments contemplated for carrying out the invention.

DETAILED DESCRIPTION

Figure 1:
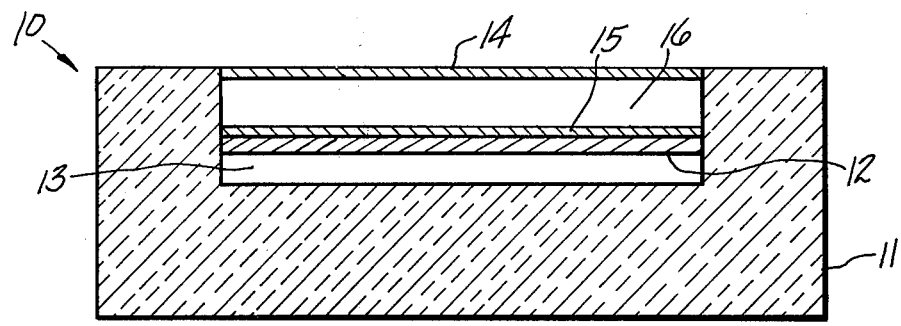
FIG. 1 is a schematic representation of one form of solar energy collector of the present invention which utilizes an asymmetric gas in the enclosed space overlying the absorber plate and air or another gas as the heat transfer fluid, shown in transverse section.

Referring now to FIG. 1, there is shown in transverse section a flat-plate solar energy collector, indicated generally as 10, which utilizes an asymmetric gas above the absorber plate and air or other gases as the heat transfer fluid. The collector 10 includes a heat insulative base 11 formed from conventional insulating materials, such as asbestos board; fiber board; mineral wool batting; cellular glass, fiber glass batting; foamed and cellular plastic material, either rigid or flexible, such as polystyrene, polyurethane and the like. A black-coated absorber plate 12 overlies the insulative base spaced therefrom to define a channel 13 for gas flow. For instance, the black-coated plate may be any conventionally used solar energy absorber plate. The black-coated plate 12 may be rigid or flexible and be in the form of a black or blackened plate or film such as a painted or plate metal sheet of aluminum or steel, a dyed or pigmented polymer, a rigid or semi-rigid sheet or a flexible film. Also, the black-coated absorber plate can be either solid or porous medium such as dyed, pigmented or painted glass fibers, painted metal fibers or painted screens with an upper surface having a high solar absorptance and a low reflectivity. Specifically, this black coating should have a large optical absorption coefficient, $\alpha$, over most of the solar spectrum, but a small emissivity, $\xi$, for thermal re-radiation.

Transparent protective covers 14 and 15 in the form of rigid or flexible sheets or films overlay the absorber plate 12. The covers 14 and 15 are normally non-porous and relatively impervious to the passage of gases and are normally made from light transmitting materials, such as glass, glass fiber- reinforced plastic sheeting, polymer films and the like. Moreover, they may be coated with an anti-reflective material such as silica, magnesium fluoride or other suitable material which will allow solar energy transmission, but substantially reduce loss of incident radiation by reflection from the cover plate 14.

In accordance with the present invention, the enclosed gas space 16 between the two transparent covers 14 and 15 is filled with an asymmetric gas such as ammonia, carbon dioxide, methylamine, dimethylamine or the like, or combinations of such gases. The employment of asymmetric gases in this space differs from prior art solar energy collection systems which instead employed air or a vacuum. Air is made up mostly of symmetric gases such as $N_2$ and $O_2$ which are transparent to both solar radiation and the infrared radiation given off as thermal energy re-radiated from the absorber plate 12. This means that neither solar radiation nor re-radiated infrared radiation will be hindered in their passage through the enclosed gas space. Asymmetric gases, on the other hand, especially ammonia, are efficient absorbers of infrared radiation while also being completely transparent to visible and near ultraviolet radiation which makes up most of the solar radiation. This means that the solar radiation will be able to travel easily through the enclosed gas space to absorber plate 12, but thermal radiation given off by the plate will be absorbed by the asymmetric gas and not be re-radiated to the ambient atmosphere. Ammonia is the preferred asymmetric gas because it is relatively non-toxic and is already a familiar and common household chemical. Furthermore, it may be advantageous in some applications to employ ammonia or other asymmetric gas as both insulating and as the heat transfer fluid. Still further, mixtures of air and asymmetric gases may be employed in gas space 16; however, the asymmetric gas should constitute a major proportion (i.e., at least about 50% by volume) of the gas space 16.

The employment of asymmetric gases in this fashion results in the so-called "greenhouse effect," where visible solar energy radiation could be completely transmitted through the transparent covers 14 and 15 and gas space 16 to absorber 12 which will convert this energy into thermal energy. In turn, the absorber will not re-radiate thermal energy to the ambient atmosphere because it will be absorbed into the asymmetric gas. Since the overall heat loss by radiation is reduced, the enclosed gas space 16 and absorber plate 12 will rise in temperature and more thermal energy will be collected by the heat transfer fluid in channel 13, and at a higher temperature, thus making it more useful in its further applications.

The system illustrated in FIG. 1 may be slightly modified in many ways. For example, it may be desirable not to employ an inner transparent cover 15 and instead the top of the absorber plate 12 will constitute the bottom side of the enclosed gas space 16. In this case, the asymmetric gas should be chosen so as not to cause any corrosion to the absorber plate 12. Also, in some instances, it may be desirable to locate channel 13 between the absorber plate 12 and the transparent cover 15. Likewise, the absorber plate 12 may be located within channel 13 with gaseous heeat transfer fluid flowing on both sides of the absorber 12. Furthermore, the gas space 16 may be divided into smaller gas space units by horizontal or vertical transparent plates in order to reduce convection.

Figure 2:
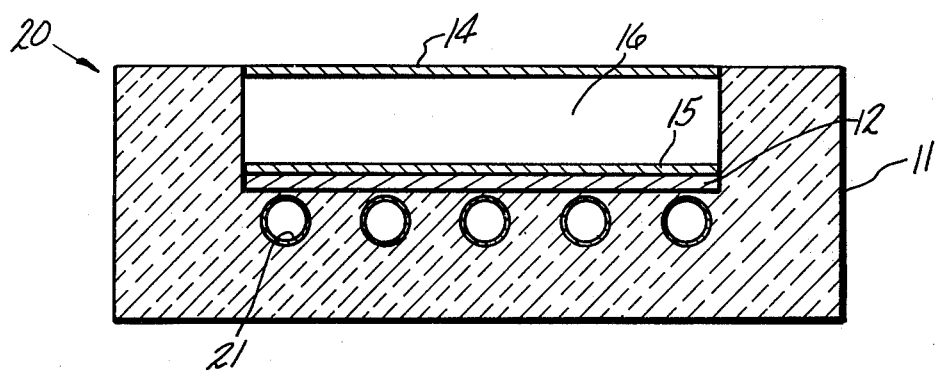
FIG. 2 is a similar schematic representation of a flat-plate solar collector which utilizes an asymmetric gas in the enclosed space above the absorber plate and water or another liquid as the heat transfer fluid.

Referring now to FIG. 2, there is shown in transverse section a similar solar energy collector, indicated generally as 20, which utilizes water or other liquid as the heat transfer fluid. This collector is generally the same as described in FIG. 1 with elements 11, 12, 14, 15 and 16 being the same, except that instead of gas channel 13, liquid flow passages such as pipes or tubes 21, are in close thermal contact with the absorber plate 12. Alternatively, the liquid flow passages 21 may be incorporated into the absorber plate, as by employing liquid-filled pipes between a pair of metal sheets.

Figure 3:
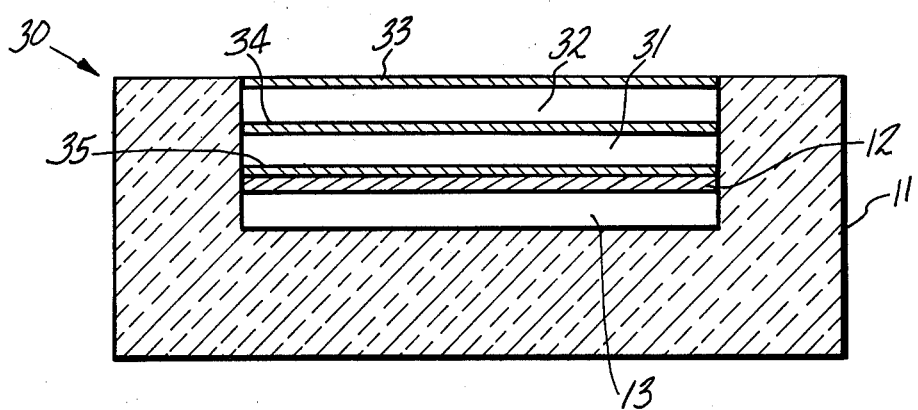
FIG. 3 is a similar representation of a flat-plate solar collector utilizing two enclosed gas spaces above the absorber plate; one space filled with an asymmetric gas and the other being vacuum.

FIG. 3 illustrates in transverse section a similar solar energy collector, indicated generally as 30, which instead has two enclosed gas spaces 31 and 32 enclosed by transparent covers 33, 34, and 35. Gas space 31 is filled with an asymmetric gas such as ammonia to prevent the loss of thermal energy by re-radiation. Gas space 32 is a vacuum or air-filled space which will prevent convection losses into the ambient atmosphere from the asymmetric gas-filled spaced 31, which will be elevated in temperature during operation.

Figure 4:
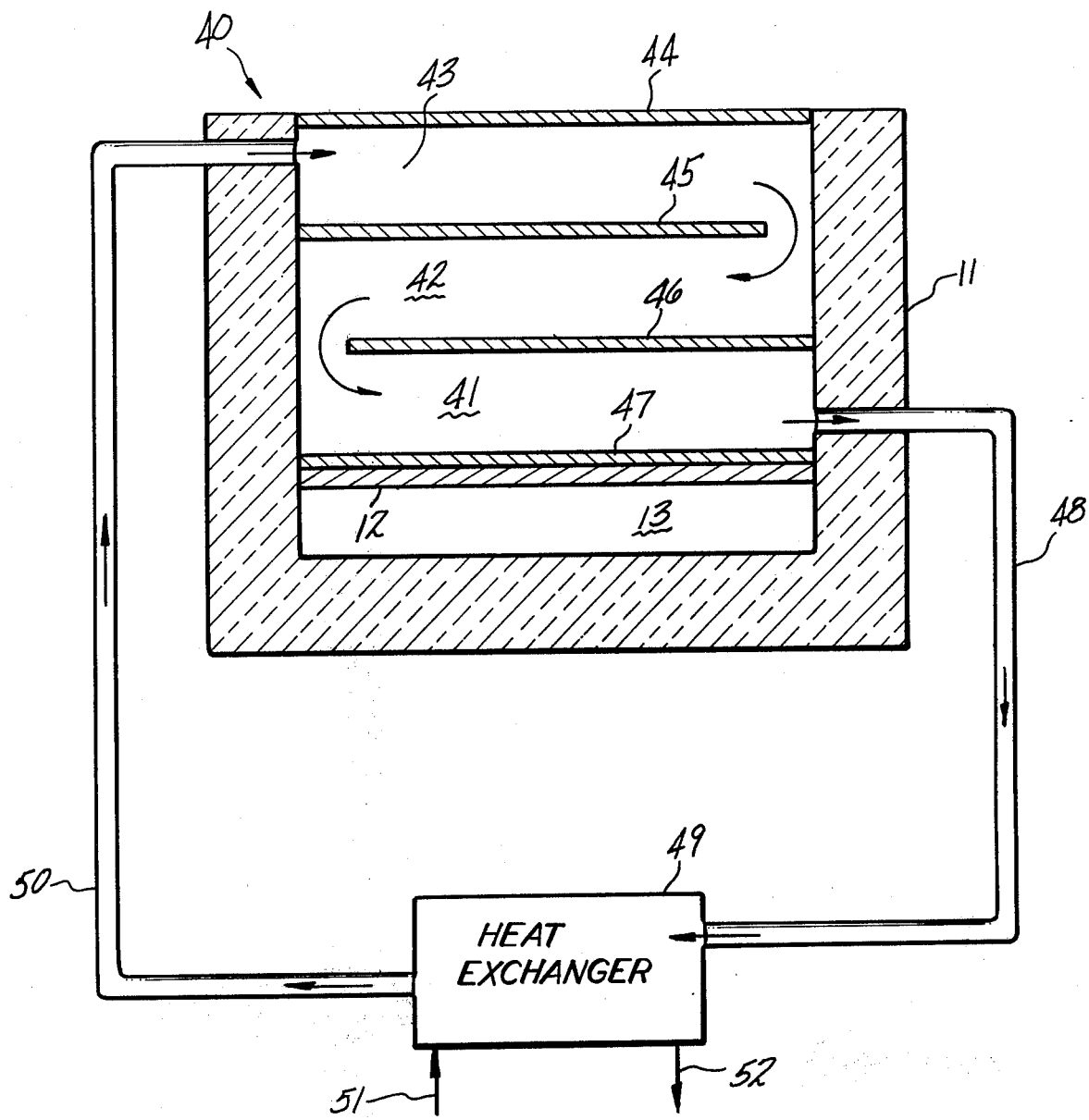
FIG. 4 is a schematic representation of a flat-plate solar collector where an asymmetric gas is recycled and the thermal heat absorbed by the gas is utilized.

FIG. 4 represents in transverse section a solar energy collector, indicated generally as 40, where the asymmetric gas is recycled and the absorbed thermal energy therein is utilized by means of a heat exchanger or economizer 49. Flowing ammonia or other asymmetric gas is introduced into gas space 43 and flows in a serpentine path through gas chambers 42 and 41 in that order. The top transparent cover 44 prevents any of the asymmetric gas from escaping into the ambient atmosphere. The intermediate transparent covers 45 and 46 are provided with one or more outlet openings at the edge of the sheets or otherwise. Preferably, these outlets are at alternately opposite edges of the cover.

In operation, the asymmetric gas flows across a transparent cover and then flows downward to the next cover and so on until it reaches the bottom transparent cover 47. As the asymmetric gas moves downward through this stack of gas spaces, its temperature rises due to its absorption of both infra-red energy in the incident sunlight and thermal re-radiation and convection from absorber plate 12. Moreover, since the asymmetric gas is coolest in gas space 43, which is closest to the ambient atmosphere conductive heat loss to the ambient atmosphere is minimized. In this embodiment, the heated asymmetric gas leaves the collector 40 by line 48. This heated gas is passed through a heat exchanger or economizer 49 where it is cooled. The cooled gas may be then continuously recirculated back to the collector via line 50. The heat removed from the gas may be utilized by passing a suitable heat transfer fluid, shown entering and exiting the heat exchanger 49 by lines 51 and 52 respectively and thereafter employing said recovered heat in various useful operations.

It is understood that the solar collectors of the present invention may be made in individual modules of any suitable size. These modules may be connected in series or parallel, or in any combination thereof. These solar collectors can be applied to the roof or other surface of a house, preferably to any south-facing or nearly south-facing surface. For application in the latitudes away from the equator, where snow build-up is expected to be a problem for roof collectors, the present collector may be mounted at a steep angle or on the south-facing walls or on any free-standing vertical surface not too far away from the energy-consuming buildings. Furthermore, it should be recognized that the present invention may be particularly advantageous when employed in industrial faculties where ammonia or other asymmetric gases are made or utilized.

What is claimed is:

1. In a process for collecting and utilizing solar radiation wherein said solar radiation is absorbed on an absorber plate and converted into thermal energy, and a portion of said thermal energy is removed from said absorber plate by means of a heat transfer fluid and thereafter utilized and another portion of said thermal energy is re-radiated; an improvement which comprises:
   (a) positioning an enclosed gas space containing an asymmetric gas between said absorber plate and the ambient atmosphere, whereby said solar radiation will pass through said gas space and at least a portion of said re-radiated thermal energy from said absorber plate will be absorbed by said asymmetric gas;
   (b) conveying said asymmetric gas containing said re-radiated thermal energy to a heat exchanger for removal of said thermal energy; and
   (c) then conveying said asymmetric gas deleted of said thermal energy back to said gas space.

2. The process of claim 1, wherein said asymmetric gas is selected from the group consisting of ammonia, carbon dioxide, methylamine and dimethylamine.

3. The process of claim 2 wherein said asymmetric gas is ammonia.

4. The process of claim 1 wherein said asymmetric gas is circulated through a serpentine path within said enclosed gas space.

5. The process of claim 4 wherein said asymmetric gas is ammonia.

6. The process of claim 1 wherein said heat transfer fluid is a gas.

7. The process of claim 1 wherein said heat transfer fluid is a liquid.

8. A solar energy collection aparatus comprising:
   (a) a heat insulative base;
   (b) an absorber plate overlying said heat insulative base; said absorber plate capable of absorbing solar radiation and converting at least a portion of said solar radiation into thermal energy;
   (c) at least one protective cover spaced above said absorber plate, said protective cover being capable of transmitting solar radiation through to said absorber plate and being impervious to the passage of gases;
   (d) at least one gas space being positioned between said absorber plate and a protective cover, said gas space filled with an asymmetric gas which is capable of absorbing thermal re-radiation;
   (e) passage means for circulating a heat transfer fluid located in close proximity to said absorber plate;
   (f) means for removing said asymmetric gas from said gas space;
   (g) means for removing absorbed thermal energy from said asymmetric gas; and
   (h) means for returning said asymmetric gas back to said gas space (d) from means (g).

9. The apparatus of claim 8 wherein said asymmetric gas is selected from the group consisting of ammonia, carbon dioxide, methylamine and dimethylamine.

10. The apparatus of claim 9 wherein said asymmetric gas is ammonia.

11. The apparatus of claim 8 wherein said heat transfer fluid is a gas.

12. The apparatus of claim 11 wherein asymmetric gas and said heat transfer fluid are the same gas.

13. The apparatus of claim 8 wherein said heat transfer fluid is a liquid.

14. The apparatus of claim 8 which includes an enclosed gas space filled with air or a vacuum overlying said gas space filled with said asymmetric gas.

15. The apparatus of claim 14 wherein said gas space containing said asymmetric gas includes a serpentine path for circulating said asymmetric gas.

* * * * *